US008607268B2

(12) United States Patent
Migos (10) Patent No.: US 8,607,268 B2
(45) Date of Patent: Dec. 10, 2013

(54) CATEGORIZED ELECTRONIC PROGRAM GUIDE

(75) Inventor: Charles J. Migos, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 580 days.

(21) Appl. No.: 12/354,056

(22) Filed: Jan. 15, 2009

(65) Prior Publication Data

US 2010/0180305 A1 Jul. 15, 2010

(51) Int. Cl.
*G06F 3/00* (2006.01)
*G06F 13/00* (2006.01)
*H04N 5/445* (2011.01)
*H04N 7/16* (2011.01)
*H04N 5/44* (2011.01)

(52) U.S. Cl.
USPC ............ 725/37; 725/38; 725/39; 725/41; 725/43; 725/44; 725/45; 725/49; 725/52; 725/53; 725/56; 725/57; 725/59; 725/61; 725/62; 348/734; 715/716

(58) Field of Classification Search
USPC ........... 725/37, 38, 39, 41, 43, 44, 45, 49, 52, 725/53, 56, 59, 62, 61; 715/716; 348/14.03, 348/734
See application file for complete search history.

(56) References Cited

U.S. PATENT DOCUMENTS

| | | | |
|---|---|---|---|
| 5,694,176 A | 12/1997 | Bruette et al. | |
| 5,758,259 A | 5/1998 | Lawler | |
| 5,801,747 A | 9/1998 | Bedard | |
| 6,437,836 B1 * | 8/2002 | Huang et al. | 348/734 |
| 6,678,891 B1 * | 1/2004 | Wilcox et al. | 725/42 |
| 6,806,887 B2 * | 10/2004 | Chernock et al. | 345/629 |
| 7,269,838 B1 | 9/2007 | Boyer et al. | |
| 2002/0010925 A1 * | 1/2002 | Kikinis | 725/39 |
| 2002/0184625 A1 * | 12/2002 | Allport | 725/39 |
| 2003/0035074 A1 * | 2/2003 | Dubil et al. | 348/734 |
| 2005/0160456 A1 | 7/2005 | Moskowitz | |
| 2006/0026635 A1 | 2/2006 | Potrebic et al. | |
| 2006/0026641 A1 * | 2/2006 | Jule et al. | 725/44 |
| 2006/0095937 A1 * | 5/2006 | Knudson et al. | 725/45 |
| 2006/0101338 A1 * | 5/2006 | Kates | 715/716 |

OTHER PUBLICATIONS

Baudisch, et al., "TV Scout: Guiding Users from Printed TV Program Guides to Personalized TV Recommendation", retrieved at <<http://patrickbaudisch.com/publications/2002-Baudisch-TV02-TVScoutGuidingUsers.pdf>>, 2008, pp. 10.

Jasinschi, et al., "Automatic TV Program Genre Classification Based on Audio Patterns", in Euromicro Conference, 2001 Proceedings, vol. 27, Issue 2001, pp. 370-375.

(Continued)

*Primary Examiner* — Pankaj Kumar
*Assistant Examiner* — Alazar Tilahun
(74) *Attorney, Agent, or Firm* — Wolfe-SBMC (57) ABSTRACT

Techniques are described to provide a categorized electronic program guide, as well as other user interfaces. In an implementation, each of a plurality of representations of content that is currently available via network for consumption are grouped into a respective one of the plurality of categories. An electronic program guide is output for display such that at least one of the categories, which is not have one or more items categorized of the currently available content, is not available for display in the electronic program guide.

20 Claims, 5 Drawing Sheets

(56) References Cited

OTHER PUBLICATIONS

Barbieri, et al., "A Personal TV Receiver with Storage and Retrieval Capabilities", retrieved at <<http://www.hitech-projects.com/hera/people/nesvadba/papers/2001%20UM%20A%20Personal%20TV%20Receiver%20with%20Storage%20and%20Retrieval%20Capabilities.pdf>>, pp. 8.

Uchyigit, et al., "A Personalised Multi-Modal Electronic Program Guide", retrieved at <<http://www.brighton.ac.uk/cmis/courses/postgraduate/pgpit/euroitv/euroitv03/Papers/Paper8.pdf>>, pp. 7.

Jin, et al., "Real-Time Filtering System on Content Semantics for Live Broadcasting", retrieved at <<http://ieeexplore.ieee.org/Xplore/login.jsp?url=/stamp/stamp.jsp?arnumber=01502399>>, Article Information, Consumer Electronics, 2005. (ISCE 2005), Issue: Jun. 14-16, 2005, pp. 339-342.

* cited by examiner

502
Display a user interface on a touch screen of a client, the user interface having a plurality of representations of categories of content that are available via a broadcast at the client

504
Scroll the display of representations of the content in a respective said category in response to a gesture received via the touch screen such that another said representation of another said category is displayed concurrently during at least a portion of the scrolling

Fig. 5

CATEGORIZED ELECTRONIC PROGRAM GUIDE

BACKGROUND

Users have access to an ever increasing variety of content, such as from cable and satellite television to streaming content via the Internet. Consequently, users are now able to access hundreds of channels that may have different types of content, such as television programs, video-on-demand, movies, sporting events, and so forth.

One technique that has been developed to help the users navigate through this vast amount of content is through the use of an electronic program guide (EPG). The EPG provides functionality similar to a printed program guide by informing the users as to which content is available and where that content is located, e.g., what channel is broadcasting the particular content. The EPG may also provide additional functionality to enable users to actually navigate to particular content represented in the EPG, cause the content to be recorded by a digital video recorder, order pay-per-view content, and so on. Because the amount of content that is available is ever increasing, however, traditional EPGs may be inefficient when confronted with hundreds and even thousands of channels of content.

SUMMARY

Techniques are described to provide a categorized electronic program guide, as well as other user interfaces. In an implementation, a plurality of representations of content, which is currently available via network for consumption, are grouped into a respective one of the plurality of categories. An electronic program guide is output for display such that at least one of the categories, which is not have one or more items categorized of the currently available content, is not available for display in the electronic program guide.

In an implementation, a user interfaces is displayed on a touch screen of a client. The user interface has a plurality of representations of categories of content that are available via a broadcast at the client. The display of representations of the content are scrolled in the respective category in response to a gesture received via the touch screen such that another representation pertaining to another category is displayed concurrently during at least a portion of the scrolling.

In an implementation, one or more computer readable media include instructions that are executable by a device to output an electronic program guide having a plurality of representations of content, which are currently available via a broadcast for consumption of the device. The plurality of representations of content are arranged in respective categories such that a representation of a category is not output that does not include at least one of the plurality of representations of content that are currently available.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 5 is a flow diagram depicting a procedure in an example implementation in which a user interface configured as an electronic program guide is output and navigated through.

DETAILED DESCRIPTION

Overview

Electronic program guides (EPGs) were developed to aid users to navigate through the vast amount of content that is now commonly available as well as to perform other functions related to the content, such as to schedule recordation, purchase conditional access rights (e.g., pay-per-view) and so on. However, as the amount of content continues to increase, traditional EPGs may become inefficient. For example, a user may be confronted with hundreds of channels, each having a multitude of content which may traditionally result in an EPG that may take a significant amount of time to navigate and therefore become inefficient.

A categorized electronic program guide (EPG) is described. In an implementation, representations of content that are currently available at a client are grouped into one of a plurality of categories. Categories that do not include a representation of an item of content are not included in the electronic program guide. In this way, "empty" categories are not displayed thereby increasing viewing efficiency of the electronic program guide. For example, a genre "football" may correspond to a particular category. If content is not currently available via a broadcast, a representation of that category is not included in the EPG. Further discussion of categorized EPGs may be found in relation to the following sections.

In the following discussion, an example environment is first described that is operable to perform techniques that relate to a categorized EPG. Example procedures are then described that may be employed in the example environment, as well as in other environments. Although these techniques are described as employed within a television environment and electronic program guide in the following discussion, it should be readily apparent that these techniques may be incorporated within a variety of other environments (e.g., other broadcast environments such as radio and non-broadcast environments such as a PVR) and user interfaces using a variety of content without departing from the spirit and scope thereof.

Example Environment

Figure 1:
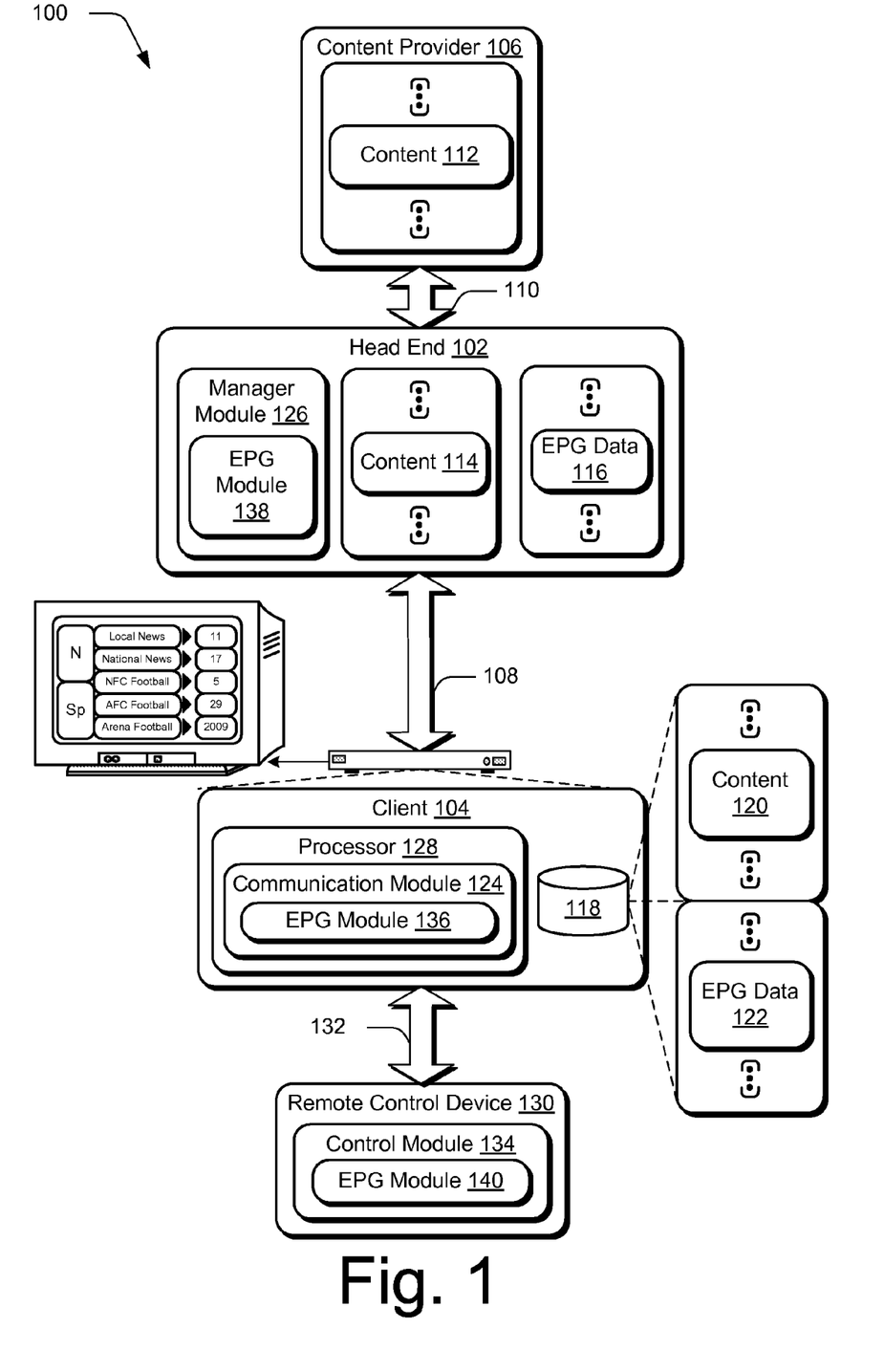
FIG. 1 is an illustration of an environment in an example implementation that is operable to employ techniques related to categorized electronic program guides (EPGs).

FIG. 1 is an illustration of an environment 100 in an example implementation that is operable to employ techniques related to categorized electronic program guides (EPG). The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone (e.g., includes telephone functionality), and so forth. For purposes of the following discussion, the client 104 may also relate to a person and/or entity that operate the client. In other words, client 104 may describe a logical client that includes a user, software and/or a device.

The content provider 106 includes one or more items of content 112. The content 112 may include a variety of data, such as television programming, video-on-demand (VOD) files, and so on. The content 112 is communicated over the network connection 110 to the head end 102. In the following discussion, content may also be referred to as "items of content", "a plurality of content", and so on.

Content 112 communicated via the network connection 110 is received by the head end 102 and may be stored as one or more items of content 114. The content 114 may be the same as or different from the content 112 received from the content provider 106. The content 114, for instance, may include additional data for broadcast to the client 104.

One example of this additional data is illustrated in FIG. 1 as electronic program guide (EPG) data 116. The EPG data 116 may be obtained from an EPG database for broadcast to the client 104, such as through use of a carousel file system. The carousel file system repeatedly broadcasts the EPG data over an out-of-band (OOB) channel to the client 104 over the network connection 108. Distribution from the head end 102 to the client 104 may be accommodated in a number of ways, including cable, radio frequency (RF), microwave, digital subscriber line (DSL), satellite, via Internet Protocol (IP) connection, and so on. Although the EPG data 116 is illustrated as being provided by the head end 102 for the sake of simplicity of the figure, it should be readily apparent that the EPG data 116 may originate from a wide variety of sources, such as a standalone third-party provider (e.g., a website).

The client 104, as previously stated, may be configured in a variety of ways to receive the content 114 and the EPG data 116 over the network connection 108. The client 104 typically includes hardware and software to transport and decrypt content 114 and the EPG data 116 received from the head end 102 for rendering by the illustrated display device. Although a display device is depicted in FIG. 1, a variety of other output devices are also contemplated, such as speakers.

The client 104 may also include personal video recorder (PVR) functionality. For instance, the client 104 may include memory 118 to record content 114 as content 120 received via the network connection 108 for output to and rendering by the display device. The memory 118 may be configured in a variety of ways, such as a hard disk drive, a removable computer-readable medium (e.g., a writable digital video disc), semiconductor based memory, and so on. Thus, content 120 that is stored in the memory 118 of the client 104 may be copies of the content 114 that was streamed from the head end 102. Additionally, the memory 118 may also be used to store EPG data 116 as EPG data 122.

The client 104 includes a communication module 124 that is executable on the client 104 to control content playback on the client 104, such as through the use of one or more "command modes" to tune to a particular channel, order pay-per-view content, and so on. The command modes may also provide non-linear playback of the content 120 (i.e., time shift the playback of the content 120) such as pause, rewind, fast forward, slow motion playback, and the like which is sometimes referred to as "trick modes".

The head end 102 is illustrated as including a manager module 126. The manager module 126 is representative of functionality to configure content 114 for output (e.g., streaming) over the network connection 108 to the client 104. The manager module 126, for instance, may configure content 112 received from the content provider 106 to be suitable for transmission over the network connection 108, such as to "packetize" the content for distribution over the Internet, configuration for a particular broadcast channel, map the content 112 to particular channels, and so on.

Thus, in the environment 100 of FIG. 1, the content provider 106 may broadcast the content 112 over a network connection 110 to a multiplicity of network operators, an example of which is illustrated as head end 102. The head end 102 may then stream the content 114 over a network connection to a multitude of clients, an example of which is illustrated as client 104. The client 104 may then store the content 114 in the memory 118 as content 120 (such as when the client 104 is configured to include personal video recorder (PVR) functionality) and/or render the content 114 immediately for output as it is received.

The client 104 is illustrated as executing the communication module 124 on a processor 128, which is also storable in memory 118. Processors 128 are not limited by the materials from which they are formed or the processing mechanisms employed therein. For example, processors 128 may be comprised of semiconductor(s) and/or transistors (e.g., electronic integrated circuits (ICs)). In such a context, processor-executable instructions may be electronically-executable instructions. Additionally, although a single memory 118 is shown for the client 104, a wide variety of types and combinations of memory may be employed, such as random access memory (RAM), hard disk memory, removable medium memory, and other types of computer-readable media.

The environment 100 is also illustrated as including another client that is configured as a remote control device 130 that is communicatively coupled to the client 104 over a network connection 132, such as a local wireless network connection. The remote control device 106 is also illustrated as including a control module 134 that is representative of functionality to control operation of the remote control device 130 and interact with the client 104.

Figure 3:
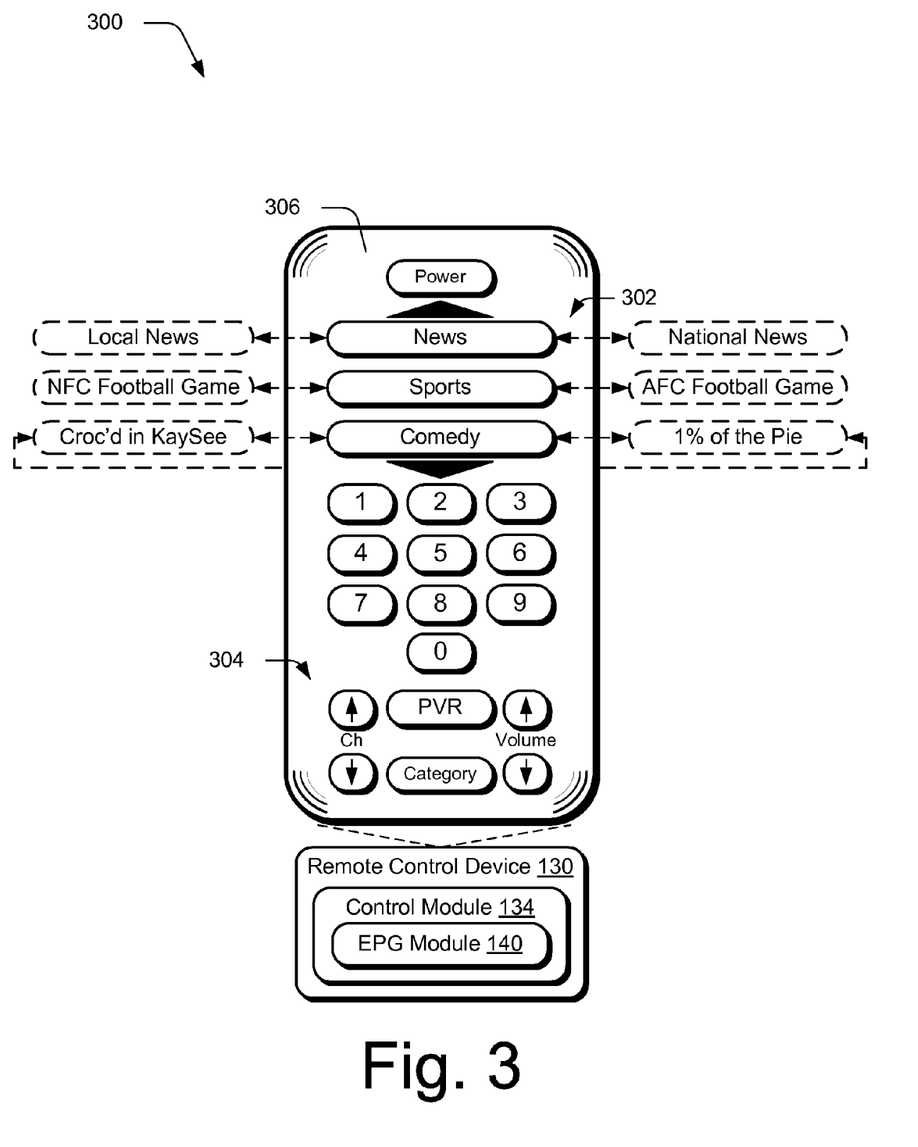
FIG. 3 is an illustration of an example implementation of a remote control device of FIG. 1 as displaying an electronic program guide and representations of control functions.

The control module 134 is representative of functionality to initiate control functions of the client 104. For example, the control module 128 may be configured to receive inputs related to selection of representations of control functions, such as a selection of a "volume up" representation on the remote control device 106 using a button. Data representing this selection may then be communicated via network connection 132 to the client 104 that causes the client 104 (e.g., the communication module 124) to increase the volume. A variety of other control functions may also be initiated by the control module 132, such as to select channels, change volume, and so on. Although not illustrated in FIG. 1, the remote control device 130 may also include a display device as illustrated in FIG. 3.

Returning back to the client 104, the communication module 124 is also illustrated as including an EPG module 136 that is representative of functionality that may be employed to generate and manage an EPG from EPG data, e.g., EPG data 116 and/or EPG data 122. For instance, the EPG module 136 may receive the EPG data 116 from the head end 102 (e.g., directly and/or from memory 118 as EPG data 122) and process the EPG data 116 to create and output an EPG as illustrated on the display device associated with the client 104. The EPG module 130 may also provide additional functionality related to interaction of a user with the EPG, such as to initiate recording of content 114 to memory 118 as content 120 as previously described.

The EPG module 136 may also include functionality to categorize representations of the content 114, 120 for display in an EPG. For example, the EPG module 136 may include a preconfigured list of categories, such as genres. The EPG module 136 may examine the EPG data 116 that describes the content 114, 118 and based on this examination assign each item of the content 114, 118 (and consequently the data describing the content 114, 118) to a respective one of the plurality of categories. In an implementation, the EPG module 136 performs this grouping in real time for content 114 that is currently available at the client 104 via a network (e.g., the network connection 108) and/or content 120 that is currently available locally from memory 118 at the client 104. Additionally, in an implementation when a category does not include an item of content that is currently available, a representation of that category is not output in the electronic program guide, further discussion of which may be found in relation to FIG. 2.

Although the functionality of the EPG module 136 has been discussed at the client 104, the functionality may be incorporated throughout the environment 100 of FIG. 1 and elsewhere such as at a standalone website. For example, the head end 102 may incorporate this functionality as represented by EPG module 138. Likewise, the remote control device 130 may also incorporate this functionality as represented by EPG module 140.

It should be noted that one or more of the entities shown in FIG. 1 may be further divided (e.g., the head end 102 may be implemented by a plurality of servers in a distributed computing system), combined (e.g., the head end 102 may incorporate functionality to generate the EPG data 116), and so on. Thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, such as the memory 118. The features of the techniques to categorize an EPG are platform-independent, meaning that the techniques may be implemented on a variety of commercial computing platforms having a variety of processors.

Example User Interfaces and Client Devices

The following discussion describes example user interfaces that may be output by the previously described example environment, as well as other environments. Thus, although portions of the following discussion refer to the environment 100 of FIG. 1, the following discussion should not necessarily be limited to that environment 100.

Figure 2:
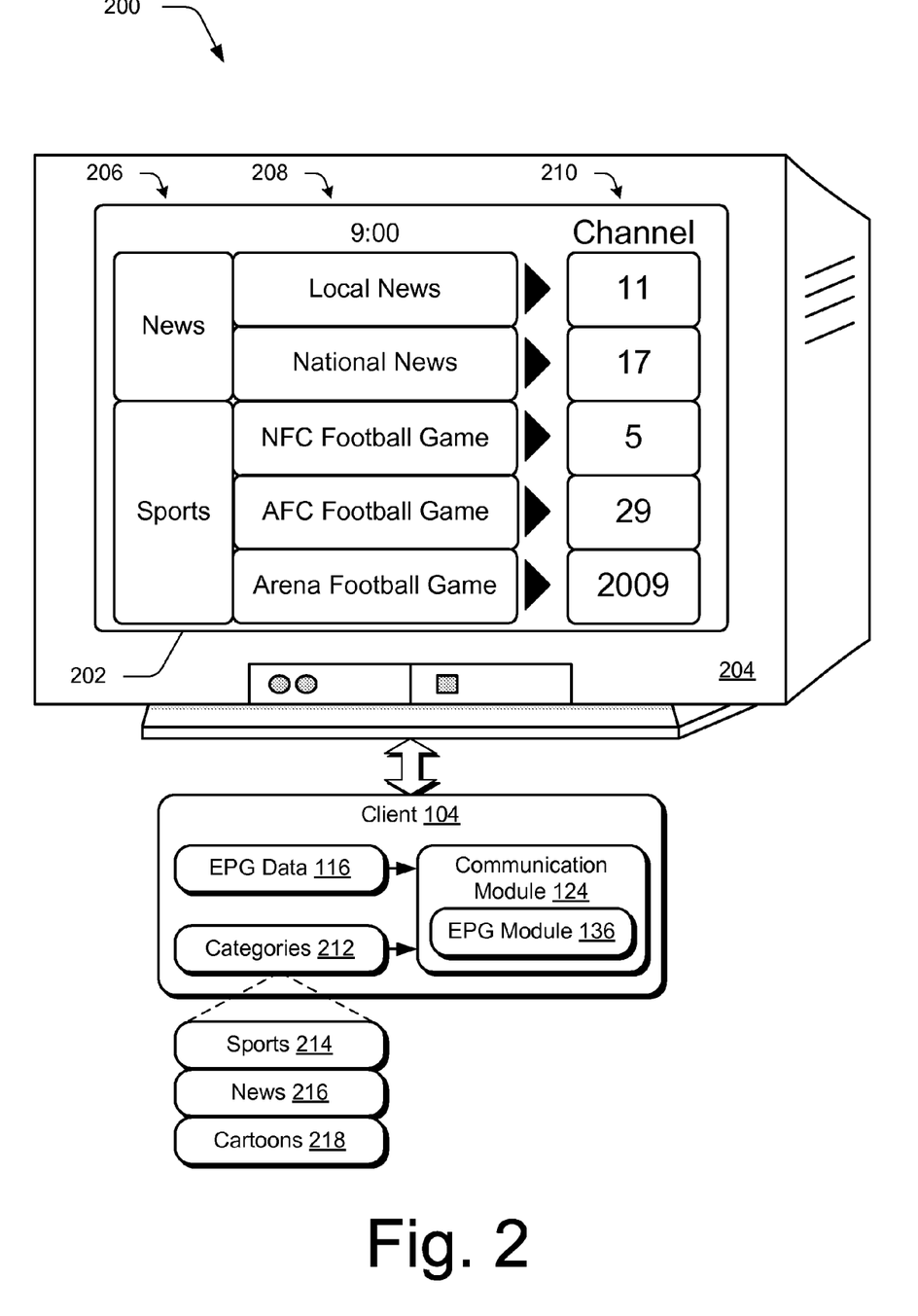
FIG. 2 is an illustration of an embodiment of an electronic program guide (EPG) as being output and displayed on a display device that includes representations of content that are grouped into categories.

FIG. 2 depicts an example implementation 200 of an electronic program guide (EPG) 202 as being output and displayed on a display device 204 that includes representations of content that are grouped into categories. The EPG 202 is arranged in a general grid format that includes a column 206 that includes representations of categories used to group content, a column 208 that includes representations of content 114 and a column 210 including representations of channels via which the respective content is available for output.

As illustrated at the client 104, the communication module 124 (and more particularly the EPG module 136) receives EPG data 116 and an indication of categories 122 in which to group representations of content. Examples of categories are illustrated as sports 214, news 216, and cartoons 218.

The EPG module 136 receives the EPG data 116 and generates representations of the content described in the EPG data 116, which are illustrated in column 208 as "local news," "national news," "NFC football game," "AFC football game," and "arena football game." The local news and national news representations are illustrated as grouped proximal to a representation of the category "news" in column 206.

Likewise, the NFC football game, AFC football game, and arena football game representations of column 208 are illustrated as grouped proximal to a representation of the category "sports" in column 206. Thus, representations included in matching categories are grouped together in the EPG 202. It should also be noted that representations of categories 212 that do not include items of content are not output, such as "cartoons" 218 in the illustrated example, thus increasing overall efficiency of an available display area of the display device 204. Although a user interface that provides electronic program guide functionality arranged as a grid has been described, a wide variety of user interfaces may employ these techniques, an example of which may be found in relation to the following figure.

FIG. 3 illustrates an example implementation 300 of the remote control device 130 of FIG. 1 as displaying an electronic program guide 302 and representations of control functions 304. The illustrated remote control device 130 includes a display device 306 (e.g., a touchscreen such as a capacitive touchscreen) that consumes approximately half of an outer surface of the remote control device thereby giving the remote control device an appearance of a "glassy brick".

In another implementation, the display device of the remote control device 130 covers at least forty percent of the outer surface of the remote control device 130. In a further implementation, the display device 306 consumes, approximately, an outer surface of the remote control device 130 that is viewable by a user when placed on a surface (e.g., a top of a table) and/or grasped in a hand of the user, e.g., the illustrated outer surface of the remote control device 130. A variety of other implementations are also contemplated, such as implementations in which the display device 306 of the remote control device 130 includes more or less than the previously described amounts of the outer surface of the remote control device 106.

The control functions 304 are illustrated as displaying buttons to control power, channel up and down, volume up and down, category, and PVR which may be selected through use of the touchscreen. The electronic program guide 302 includes representations of categories (e.g., genres) arranged in a vertical column, examples of which include "news," "sports," and "comedy." The illustrated arrows indicate that additional representations of categories are available off screen may be "scrolled to" using vertical scrolling, e.g., by dragging one or more fingers of a user's hand vertically across the surface of the display device 306 or using a variety of other gestures or cursor-control devices.

Navigation through the electronic program guide 302 may also be performed horizontally to access representations of content grouped in the respective categories that may also be available off screen, e.g., not currently displayed. For example, a user may select the "comedy" representation and make a "drag" gesture to access representations of content in that category which are shown in phantom in FIG. 3. In an implementation, the scrolling may continue using a carousel technique to progress through each of the representations in that category in either direction and return to the comedy representation. This is illustrated in FIG. 3 through the use of phantom lines with arrows to indicate available horizontal scrolling directions and an example display order for the representations of the content and/or categories.

Additionally, representations in the other rows may remain displayed in the electronic program guide 302 such that the representations in other categories are displayed concurrently. For example, the representations of the other categories and/or other content may "remain as is" such that a user may compare content and/or categories. For instance, a user may scroll to a "1% of the Pie" representation in the comedy row which may remain displayed while a user scrolls to a "Local News" representation in the news row. Thus, a user may be readily compare content in different categories. Additionally, representations of categories may be provided in a variety of ways, such as through color coding and the like. Further, a variety of other examples are also contemplated without departing from the spirit and scope thereof, such as through the use of nested menus such that a user may "drill down" to content of interest, such as to select from a representation of a category, that causes display of representations of content in that category that are currently available and/or will be available in the future.

Example Procedure

The following discussion describes EPG categorization techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the user interfaces of FIGS. 2-3, respectively.

Figure 4:
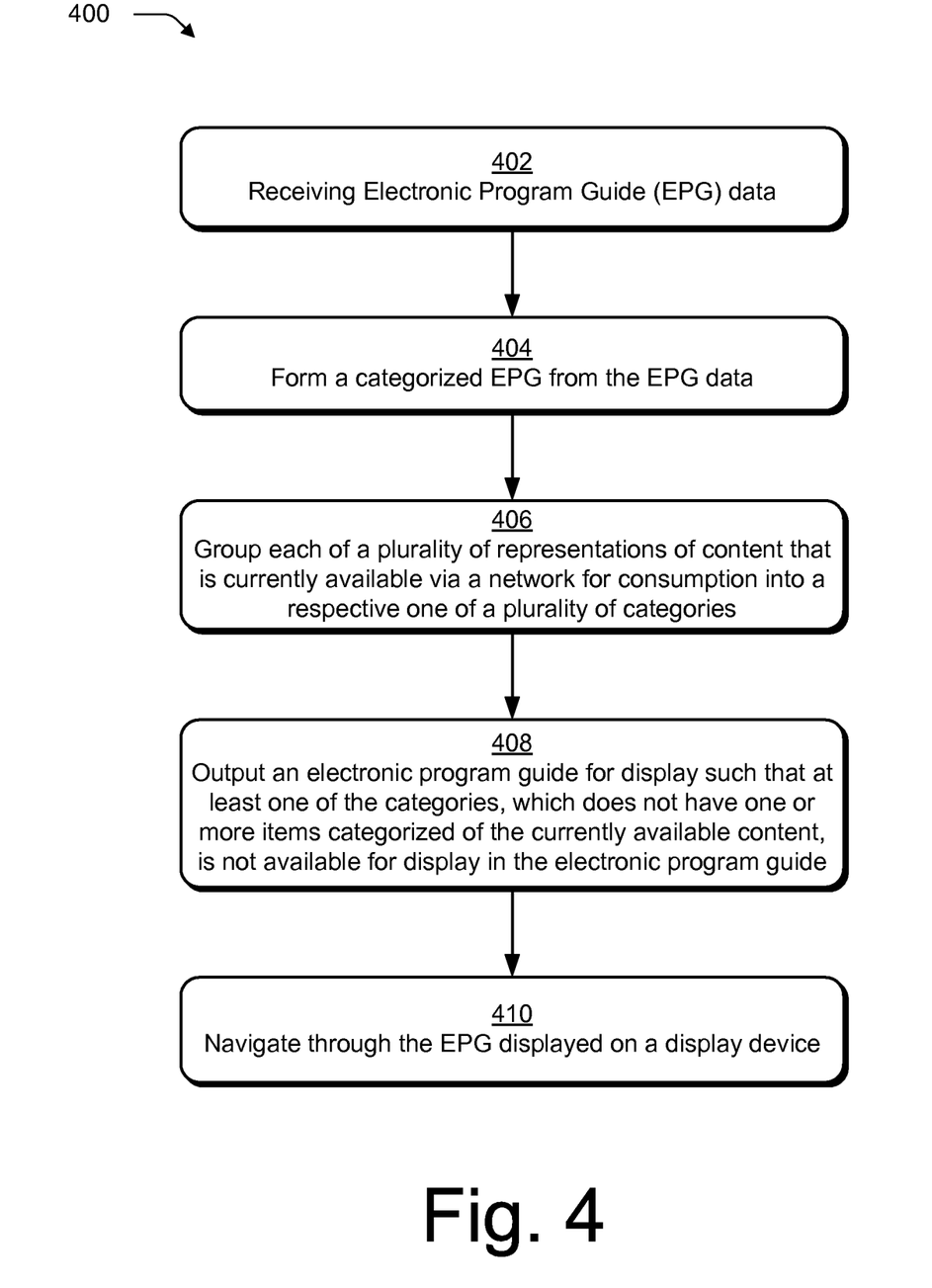
FIG. 4 is a flow diagram depicting a procedure in an example implementation in which an electronic program guide is categorized.

FIG. 4 depicts a procedure 400 in an example implementation in which an electronic program guide is categorized. Electronic program guide (EPG) data is received (block 402). For example, the client 104 may receive EPG data 116 via network connection 108 as shown in FIG. 1. In another example, the remote control device 130 may receive EPG data 116, such as directly from the head end 102 indirectly through the client 104, and so on.

A categorized EPG is formed from the EPG data (block 404). This may be performed in a variety of ways. For example, each of a plurality of representations of content that is currently available via a network for consumption may be grouped into a respective one of a plurality of categories (block 406). The categories may relate to a variety of different characteristics of the content described by the EPG data 116, such as genre, source, and so on. Additionally, the content may be currently available in a variety of ways, such as available via a broadcast over a network (e.g., such as for television content and radio content), available from storage that is local to the client (e.g., a client having PVR functionality), and so on. Further, initiation of the formation may be performed in a variety of ways, such as by pressing a dedicated button (e.g., "Category") on the remote control device 130 as illustrated in FIG. 3.

An electronic program guide is output for display such that at least one of the categories, which is not have one or more items categorized of the currently available content, is not available for display in the electronic program guide (block 408). As previously described in relation to FIG. 2, for instance, the cartoons 218 category is not displayed in the EPG 202 output by the client 104 for rendering on the display device 204. Navigation may then be performed through the EPG displayed on the display device and then be navigated (block 410) in a variety of ways, an example of which may be found in relation to the following figure.

Figure 5:
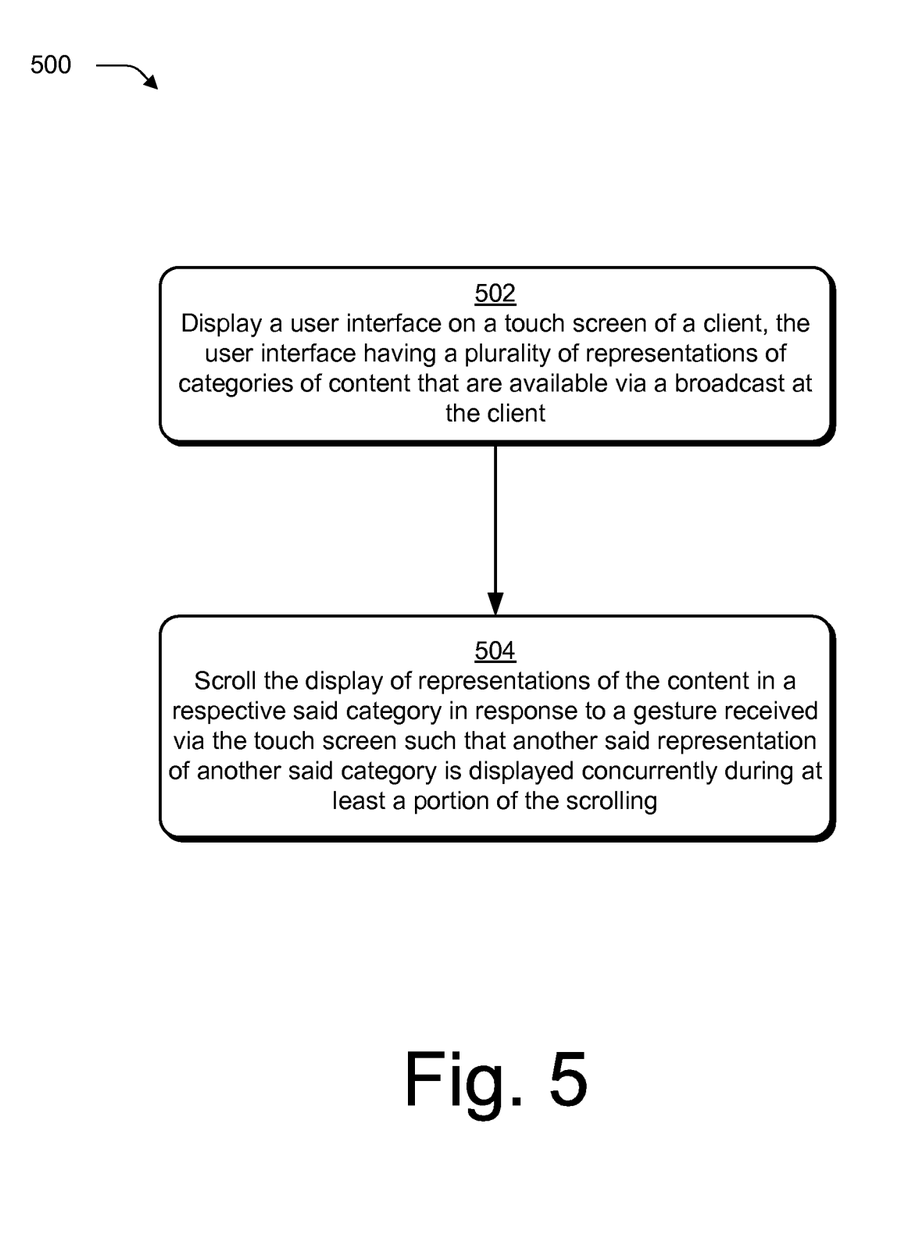

FIG. 5 depicts a procedure 500 in an example implementation in which a user interface configured as an electronic program guide is output and navigated through. A user interface is displayed on a touch screen of a client, the user interface having a plurality of representations of categories of content that are available via a broadcast at the client (block 502). As shown in FIG. 3, for instance, the user interface 302 may be output on the client configured as a remote control device 130. The user interface 302 includes representations of categories used to group content, examples of which include news, sports, and comedy.

The display of representations of the content in a respective one of the categories is scrolled in response to a gesture received via the touch screen such that another one of the representations of another one of the categories is displayed concurrently during at least a portion of the scrolling (block 504). For example, as previously described in relation to FIG. 3 representations of content in the respective category may be scrolled through gestures applied to the touch screen of the remote control device 130. During the scrolling through the representations of content in the comedy category, for instance, representations of other categories (e.g., sports and news in the EPG 302 of FIG. 3) and/or content (e.g., local news, national news, 1% of the pie, and so on) may be displayed in the user interface 302 on the remote control device 130. A variety of other examples are also contemplated without departing from the spirit and scope thereof.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
grouping each of a plurality of representations of content that is currently available via a network for consumption into a respective one of a plurality of categories; and
outputting an electronic program guide for display on a touch screen of a mobile entertainment appliance, the electronic program guide configured to present content grouped within the plurality of categories in a grid display such that:

said representations of content in a matching said category are arranged for display together in the electronic program guide;

a representation is displayed to denote a respective said category;

the electronic program guide is manipulable via a gesture applied to the touch screen to scroll through the representations of different items of content within the grid display that are grouped in an individual category during concurrent display in the grid display of one or more other representations of other content associated with another said category on the touch screen that remain as is, such that items within different concurrently displayed categories are scrollable independently from one another, the representation of the category being scrollable together with the different items of content within the category such that a continued scroll in a single direction includes a progression through each of the representations of the different items of content within the category and return to the representation of the category; and at least one said category, which does not have one or more items categorized of the currently available content, is not presented for display in the electronic program guide.

2. A method as described in claim 1, wherein each said category corresponds to a respective one of a plurality of genres.

3. A method as described in claim 1, wherein the outputting is performed such that each said representation of the respective said category includes an indication of a number of said items of content that are grouped in the category.

4. A method as described in claim 1, wherein the grouping and the outputting are performed in real time.

5. A method as described in claim 1, wherein the grouping and the outputting are performed at a client in response to selection of an option to initiate the grouping at the client.

6. A method as described in claim 1, further comprising receiving electronic program guide data over the network and generating the representations of the content based on the electronic program guide data.

7. A method as described in claim 1, wherein the network is a broadcast network having a plurality of channels.

8. A method as described in claim 1, wherein the outputting is performed by a remote control device that is configured to initiate one or more control functions of another client that is configured to output the content.

9. A method comprising:
displaying a user interface on a touch screen of a client, the user interface having a plurality of representations of categories of content that are available via a broadcast at the client and configured to hide one or more defined categories for which there are no content items currently available; and scrolling within the displayed user interface representations of the content in a respective said category in response to a gesture received via the touch screen to scroll said category individually within the displayed user interface such that another said representation of another said category remains displayed as is in the displayed user interface during at least a portion of the scrolling, each said category manipulable to scroll through items within the category using a carousel technique without changing the display of other said categories, said category having a representation that is scrollable together with the representations of items within said category such that a continued scroll in a single direction includes a progression through each of the representations of the items within said category and return to the representation of said category.

10. A method as described in claim 9, wherein the representations of the categories are displayed vertically in the user interface and the representations of the content in the respective said categories are scrollable horizontally in the user interface.

11. A method as described in claim 9, further comprising:
grouping each of the plurality of representations of content that is currently available for consumption at a client into a respective one of the plurality of categories.

12. A method as described in claim 9, wherein the content includes television programming and the user interface is an electronic program guide.

13. A method as described in claim 9, wherein the client includes telephone functionality.

14. A method as described in claim 9, wherein the client includes functionality to initiate one or more control functions of another client that is configured to display the content.

15. A method as described in claim 9, wherein the client is not configured to display the content.

16. A mobile entertainment device comprising:
one or more processors;
a touch screen;
one or more computer readable memory devices having instructions stored thereon that are executable by the one or more processors to output an electronic program guide having a plurality of representations of content, which are currently available via a broadcast for consumption at the device, arranged in different respective categories in a displayed grid on the touch screen such that:
available representations of content within the different respective categories are displayed in the grid concurrently and a representation of a defined category is not output when the defined category does not match at least one item of content that is currently available;
the different respective categories are selectable for scrolling through the touch screen on an individual basis to enable a user to scroll content in the displayed grid within a particular category while content in other said categories displayed concurrently remains as is and navigation individually of each category to display selected representations of different content within different respective categories together in the electronic program guide for comparison one to another, the particular category having a representation that is scrollable together with the content within the particular category such that a continued scroll in a single direction includes a progression through each representation of the content within the particular category and return to the representation of the particular category.

17. A mobile entertainment device as described in claim 16, wherein at least one said item of the content is content and the broadcast includes a plurality of channels via which the content is available.

18. A mobile entertainment device as described in claim 16, wherein the representations of the categories are displayed vertically in the electronic program guide and the representations of the content in the respective said categories are scrollable horizontally in the electronic program guide.

19. A mobile entertainment device as described in claim 16, wherein the representations of the categories are displayed in a vertical list in the electronic program guide and the vertical list is scrollable to display one or more hidden categories.

20. A method as described in claim 9, wherein the representations of the categories are displayed vertically in the user interface and the representations of the categories are vertically scrollable to display one or more additional categories that are not initially displayed.

* * * * *